(12) United States Patent
Fung et al.

(10) Patent No.: US 8,863,059 B1
(45) Date of Patent: Oct. 14, 2014

(54) INTEGRATED CIRCUIT DEVICE CONFIGURATION METHODS ADAPTED TO ACCOUNT FOR RETIMING

(71) Applicant: Altera Corporation, San Jose, CA (US)

(72) Inventors: Ryan Fung, Mississauga (CA); David Lewis, Toronto (CA); Valavan Manohararajah, Scarborough (CA)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/930,018

(22) Filed: Jun. 28, 2013

(51) Int. Cl.
*G06F 17/50* (2006.01)

(52) U.S. Cl.
CPC .................................. *G06F 17/5054* (2013.01)
USPC ........... 716/113; 716/108; 716/110; 716/111; 716/116; 716/117; 716/132; 716/134

(58) Field of Classification Search
CPC . G06F 17/50; G06F 17/5045; G06F 2217/84; G06F 17/5054; H03K 19/17728; H03K 19/17736
USPC ................ 716/116–117, 100, 101, 104, 108, 716/110–111, 113, 126, 132, 134
See application file for complete search history.

(56) References Cited

U.S. PATENT DOCUMENTS

| | | | |
|---|---|---|---|
| 849,681 A * | 4/1907 | Hauver | 30/172 |
| 5,663,888 A | 9/1997 | Chakradhar | |
| 5,784,313 A * | 7/1998 | Trimberger et al. | 365/182 |
| 5,822,217 A * | 10/1998 | Shenoy | 716/108 |
| 6,263,483 B1 | 7/2001 | Dupenloup | |
| 6,378,123 B1 | 4/2002 | Dupenloup | |
| 6,466,898 B1 | 10/2002 | Chan | |
| 7,120,883 B1 * | 10/2006 | van Antwerpen et al. | 716/102 |
| 7,157,934 B2 * | 1/2007 | Teifel et al. | 326/38 |
| 7,203,919 B2 * | 4/2007 | Suaris et al. | 716/108 |
| 7,299,458 B2 | 11/2007 | Hammes | |
| 7,405,589 B2 | 7/2008 | Lewis et al. | |
| 7,594,195 B2 | 9/2009 | Jain et al. | |
| 7,689,955 B1 * | 3/2010 | van Antwerpen et al. | 716/113 |
| 7,739,641 B1 | 6/2010 | Barnes | |
| 7,926,016 B1 | 4/2011 | Sundararajan et al. | |
| 7,979,835 B1 * | 7/2011 | Schumacher et al. | 716/136 |
| 8,108,812 B1 * | 1/2012 | van Antwerpen et al. | 716/104 |
| 8,176,449 B1 * | 5/2012 | Petithomme | 716/103 |
| 8,286,137 B2 | 10/2012 | Kahlon et al. | |
| 8,296,696 B1 * | 10/2012 | Chiu et al. | 716/104 |
| 8,381,142 B1 * | 2/2013 | Hutton | 716/100 |
| 8,402,408 B1 * | 3/2013 | Van Antwerpen et al. | 716/116 |
| 8,423,939 B1 * | 4/2013 | Hurst | 716/114 |
| 8,589,845 B2 * | 11/2013 | Albrecht et al. | 716/113 |

(Continued)

OTHER PUBLICATIONS

Egu, K., et al., Armada: Timing Driven Pipeline Aware Ruting for FPGAs, 206, ACM. pp. 1-10.*

(Continued)

*Primary Examiner* — Stacy Whitmore
(74) *Attorney, Agent, or Firm* — Ropes & Gray LLP; Jeffrey H. Ingerman

(57) ABSTRACT

A method of configuring an integrated circuit device with a user logic design includes analyzing the user logic design to identify timing requirements of paths within the user logic design, determining latency requirements along those paths, routing the user logic design based on availability of storage elements for incorporation into those paths to satisfy the latency requirements, and retiming the user logic design following that routing by incorporating at least some of the storage elements.

24 Claims, 6 Drawing Sheets

(56) References Cited

U.S. PATENT DOCUMENTS

| | | | |
|---|---|---|---|
| 8,677,298 B1* | 3/2014 | Manohararajah et al. | 716/116 |
| 2002/0162097 A1 | 10/2002 | Meribout | |
| 2004/0068711 A1 | 4/2004 | Gupta et al. | |
| 2004/0225970 A1* | 11/2004 | Oktem | 716/1 |
| 2005/0132316 A1* | 6/2005 | Suaris et al. | 716/11 |
| 2007/0074139 A1* | 3/2007 | Oktem | 716/13 |
| 2008/0276209 A1 | 11/2008 | Albrecht et al. | |
| 2008/0276212 A1* | 11/2008 | Albrecht | 716/10 |
| 2009/0146686 A1 | 6/2009 | Voogel et al. | |
| 2009/0241083 A1* | 9/2009 | Olgiati et al. | 716/9 |
| 2009/0293032 A1* | 11/2009 | Oktem | 716/6 |
| 2010/0058261 A1 | 3/2010 | Markov et al. | |
| 2010/0115477 A1* | 5/2010 | Albrecht et al. | 716/2 |
| 2010/0134141 A1 | 6/2010 | Bertin et al. | |
| 2010/0213977 A1* | 8/2010 | Redgrave | 326/40 |
| 2011/0227606 A1 | 9/2011 | Wang et al. | |
| 2011/0252389 A1* | 10/2011 | Albrecht et al. | 716/108 |
| 2012/0227026 A1 | 9/2012 | Goldman et al. | |
| 2013/0239081 A1* | 9/2013 | Oktem | 716/113 |
| 2013/0297278 A1* | 11/2013 | Narayanaswamy et al. | 703/14 |

OTHER PUBLICATIONS

Samala, H., "Methodology to Derive Resource AwareContext Adaptable Architectures for Field Programmable Gate Arrays", Dec. 1, 2009, Utah State University, pa1-61.*

Betz, V., et al., *Architecture and CAD for Deep-Submicron FPGAs*, Kluwer Academic Publishers, Feb. 1999.

Carloni, L.P., et al., "A Methodology for Correct-by-Construction Latency Insensitive Design", *ICCAD '99: Proceedings of the 1999 IEEE/ACM International Conference on Computer-aided Design*, pp. 309-315, 1999.

Cong, J., et al., "Physical Planning with Retiming", *ICCAD-2000: Proceedings of the 2000 IEEE/ACM International Conference on Computer-aided Design*, pp. 2-7, 2000.

Cormen, T.H., et al., *Introduction to Algorithms*, MIT Press and McGraw Hill, Third Edition, pp. 651-655, 2009.

Dasdan, A., "Experimental Analysis of the Fastest Optimum Cycle Ratio and Mean Algorithms", *ACM Transactions on Design Automation of Electronic Systems*, vol. 9, No. 4, pp. 385-418, Oct. 2004.

Deokar, R.B., et al., "A Fresh Look at Retiming via Clock Skew Optimization", *DAC '95: Proceedings of the 32nd Annual ACM/IEEE Design Automation Conference*, pp. 310-315, 1995.

Eguro, K., "Supporting High-Performance Pipelined Computation in Commodity-Style FPGAs", University of Washington doctoral dissertation, pp. 1-168 (2008).

Hurst, A.P., et al., "Physical Placement Driven by Sequential Timing Analysis", *ICCAD-2004: Proceedings of the 2004 IEEE/ACM International Conference on Computer-aided Design*, pp. 379-386, 2004.

Leiserson, C.E., et al., "Retiming Synchronous Circuitry", Digital Equipment Corporation, Aug. 20, 1986, published in *Algorithmica*, vol. 6, No. 1, pp. 5-35, Jun. 1991.

Li, S., et al., "QuickRoute: A Fast Routing Algorithm for Pipelined Architectures", *2004 IEEE International Conference on Field-Programmable Technology* pp. 73-80 (2004).

Maheshwari, N., et al., *Timing Analysis and Optimization of Sequential Circuits*, Springer, pp. 9, 14-17, 1998.

Manohararajah, V., et al., "Heuristics for Area Minimization in LUT-Based FPGA Technology Mapping", *IEEE Transactions on CAD*, vol. 25, No. 11, pp. 2331-2340, Nov. 2006.

Sharma, A., et al., "PipeRoute: A Pipelining-Aware Router for FPGAs", *FPGA '03: Proceedings of the 2003 ACM/SIGDA eleventh international symposium on Field programmable gate arrays*, pp. 68-77 (Feb. 23-25, 2003).

Singh, D.P., et al., Integrated Retiming and Placement for Field Programmable Gate Arrays, *FPGA '02: ACM International Symposium on Field Programmable Gate Arrays*, pp. 67-76, Feb. 2002.

Singh, D., et al., "The Case for Registered Routing Switches in Field Programmable Gate Arrays", *FPGA '01: Proceedings of the 2001 ACM/SIGDA ninth international symposium on Field programmable gate arrays*, pp. 161-169 (Feb. 11-13, 2001).

Tsu, W., et al., "HSRA: High-Speed, Hierarchical Synchronous Reconfigurable Array", *FPGA '99: Proceedings of the 1999 ACM/SIGDA seventh international symposium on Field programmable gate arrays*, pp. 125-134 (1999).

Weaver, N., et al., "Post-Placement C-Slow Retiming for the Xilinx Virtex FPGA", *FPGA '03: ACM International Symposium on Field Programmable Gate Arrays*, pp. 185-194, Feb. 2003.

Weaver, N., et al., "The Effects of Datapath Placement and C-Slow Retiming on Three Computational Benchmarks", *FCCM '02: The 10th Annual IEEE Symposium on Field-Programmable Custom Computing Machines*, pp. 303-306, Feb. 2003.

* cited by examiner

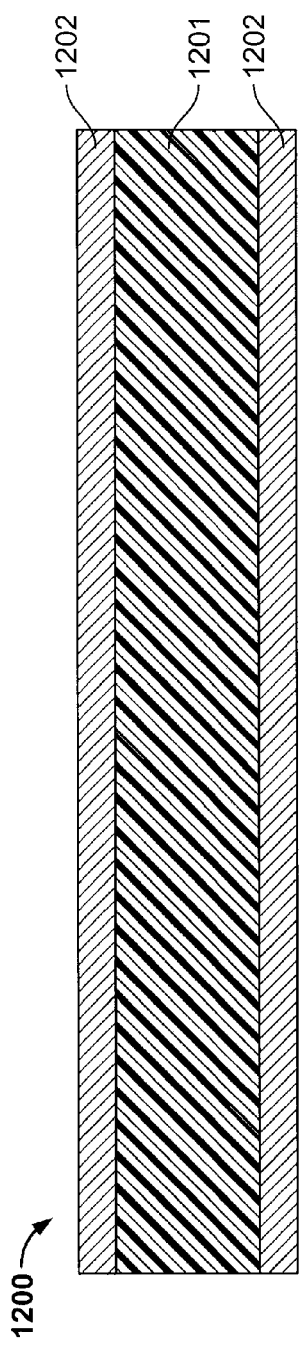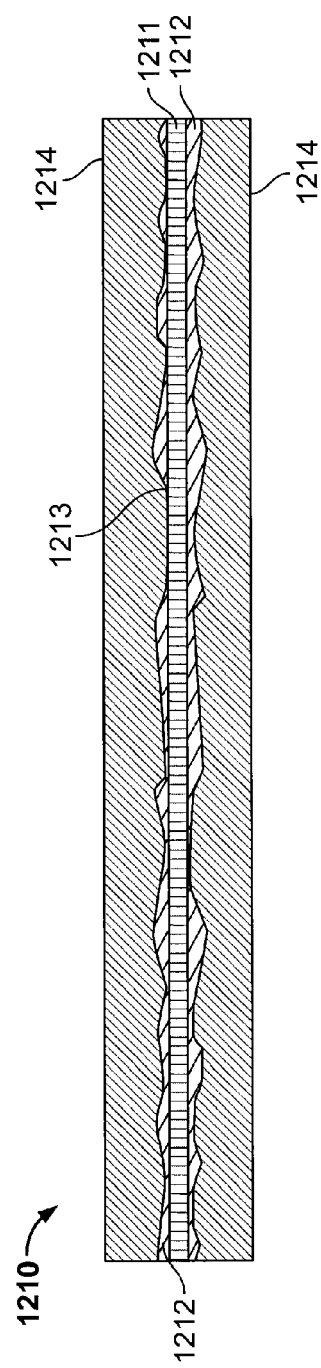

US 8,863,059 B1

INTEGRATED CIRCUIT DEVICE CONFIGURATION METHODS ADAPTED TO ACCOUNT FOR RETIMING

FIELD OF THE INVENTION

This invention relates to design or configuration methods for integrated circuit devices, including, e.g., field-programmable gate array (FPGAs) or other types of programmable logic devices (PLDs), and to design or configuration methods, for designing or configuring such devices, that account for the ability to retime the design or configuration.

BACKGROUND OF THE INVENTION

Early programmable devices were one-time configurable. For example, configuration may have been achieved by "blowing"—i.e., opening—fusible links. Alternatively, the configuration may have been stored in a programmable read-only memory. Those devices generally provided the user with the ability to configure the devices for "sum-of-products" (or "P-TERM") logic operations. Later, such programmable logic devices incorporating erasable programmable read-only memory (EPROM) for configuration became available, allowing the devices to be reconfigured.

Still later, programmable devices incorporating static random access memory (SRAM) elements for configuration became available. These devices, which also can be reconfigured, store their configuration in a nonvolatile memory such as an EPROM, from which the configuration is loaded into the SRAM elements when the device is powered up. These devices generally provide the user with the ability to configure the devices for look-up-table-type logic operations.

While it may have been possible to configure the earliest programmable logic devices manually, simply by determining mentally where various elements should be laid out, it was common even in connection with such earlier devices to provide programming software that allowed a user to lay out logic as desired and then translate that logic into a configuration for the programmable device. With current larger devices, it would be impractical to attempt to lay out the logic without such software. Similar software may be used to design fixed logic devices such as application-specific integrated circuits (ASICs).

Some user logic designs would be able to operate at higher clock speeds if the designs could be optimized. However, known configuration methods do not always take all possible optimizations into account.

SUMMARY OF THE INVENTION

Known configuration methods for programmable integrated circuit devices, as well as design methods for application-specific integrated circuits, optimize circuit designs by detecting the paths with the longest delay and applying optimization techniques to reduce or "crush" those delays. However, such techniques may not properly account for the ability to "retime" a design by moving registers within the design.

In particular, unidirectional or "feed-forward" logic paths are amenable to pipelining. And pipelined circuits can be retimed by changing the distribution of pipeline registers. Normally, this is accomplished by moving registers forward in a pipelined path. However, when a path is retimed, parallel paths are retimed as well to maintain circuit operability. However, there are not always enough registers available in all paths to support retiming.

The present invention provides methods for taking register availability into account when routing a logic design, to support retiming that may be required.

Therefore, in accordance with the present invention there is provided a method of configuring an integrated circuit device with a user logic design. The method includes analyzing the user logic design to identify timing requirements of paths within the user logic design, determining latency requirements along those paths, routing the user logic design based on availability of storage elements for incorporation into those paths to satisfy the latency requirements, and retiming the user logic design following that routing by incorporating at least some of the storage elements.

A machine-readable data storage medium encoded with instructions for carrying out such a method also is provided.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which:

FIG. 9 is a cross-sectional view of a magnetic data storage medium encoded with a set of machine-executable instructions for performing the method according to the present invention;

FIG. 10 is a cross-sectional view of an optically readable data storage medium encoded with a set of machine executable instructions for performing the method according to the present invention.

DETAILED DESCRIPTION OF THE INVENTION

Timing analysis under the assumption of the availability of retiming is known. For example, copending, commonly-assigned U.S. patent application Ser. No. 13/733,982, which is hereby incorporated by reference herein in its entirety, describes a method which identifies cyclic paths for optimization, leaving feed-forward paths to be retimed. However, even on a device which is physically provided with a large number of registers, retiming of a user logic design may not always be possible to the extent required, if the initial routing of the user logic design does not take potential retiming into account and provide sufficient optional registers in locations where they may be needed for retiming.

Figure 1:
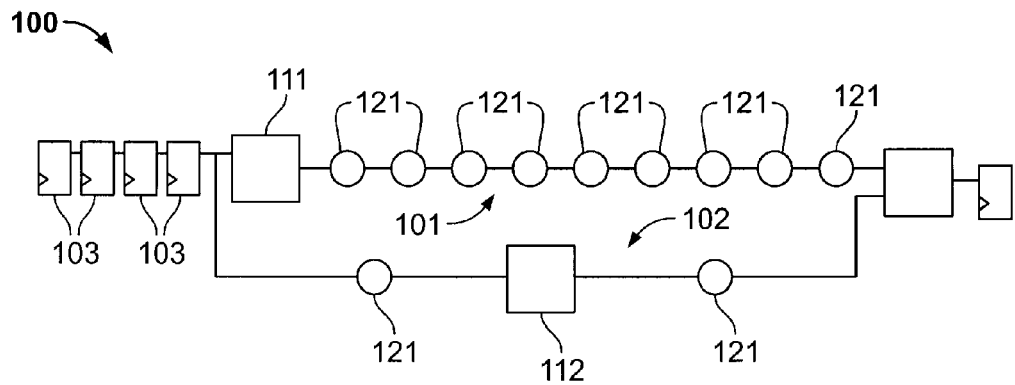
FIG. 1 shows an example of a logic circuit portion to be retimed.
Figure 2:
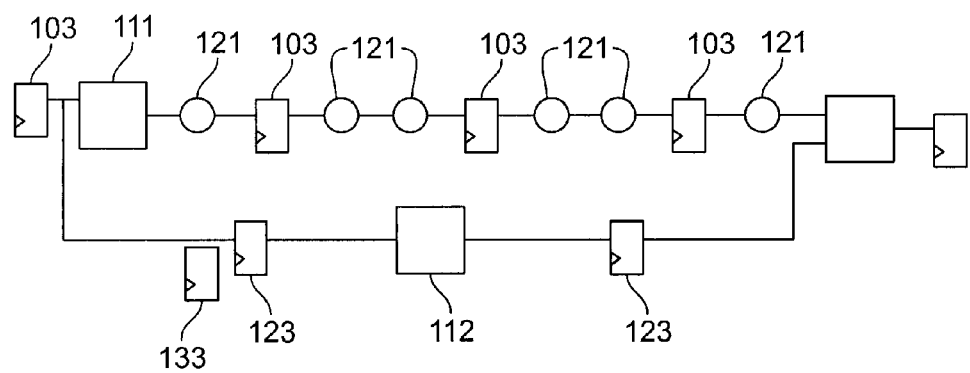
FIG. 2 shows an example of an attempted retiming of the logic circuit portion of FIG. 1.
Figure 3:
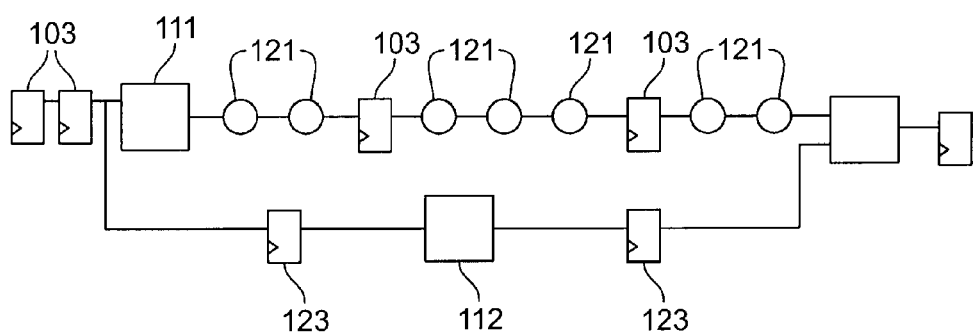
FIG. 3 shows an example of a resulting retiming of the logic circuit portion of FIG. 1.

An example of such a condition may be seen in FIGS. 1-3. FIG. 1 shows a portion 100 of a logic design having two parallel paths 101, 102. Upper path 101 includes one logic element 111 and nine routing elements 121. For purposes of this example, logic element 111 and routing elements 121 are assumed to have identical unit delays. Lower path 102 includes one logic element 112 and two routing elements 121. To maximize timing performance, the delays between registers should be minimized. Because of the longer length of path 101, it may benefit from retiming (the insertion of registers into the long combinational path), with some of input registers 103 moved forward into path 101.

In the example 200 of FIG. 2, three registers 103 have been moved forward into path 101. In one embodiment, routing elements 121 may include optional registers, and the registers are enabled if retiming is desired; thus in this case, the optional registers in the three routing elements 121 have been enabled). This necessitates the introduction of three registers 123 into path 102. However, with only two routing elements 121 available to have their registers enabled, path 102 lacks sufficient register capacity to enable three registers 123 (this condition is represented by lone unconnected register 133). The result is the less optimally retimed circuit 300 of FIG. 3, where only two of registers 103 can be pushed forward into path 101, balanced by two registers 123 enabled in path 102.

Instead of provided routing elements with optionally enabled registers, retiming may be accomplished by rerouting path 101 to pass through nearby registers in place of passing through routing elements 121. Other ways of incorporating additional registers in place of routing elements 121 may be devised.

To address the limited number of registers 123 in path 102, the routing technique can be modified in accordance with embodiments of the invention to increase the likelihood that adequate register capacity is available where it may be needed. For the purposes of this disclosure, this may be referred to as register-aware routing. In programmable devices with architectures that include large numbers of registers, increasing register capacity may not be needed on timing-critical paths, because those paths can be expected to include many architectural elements that have optional registers that may be enabled. Additional register capacity is generally needed on paths that have fewer architectural elements, where the insertion of registers would be needed not to break up long delay paths, but to add latency to match the insertion of registers elsewhere.

Thus, register-aware routing may amount to taking more circuitous routes on non-critical paths to incorporate enough elements which can be converted to registers (or in which registers can be enabled) during retiming if needed. However, some programmable device architectures may provide fewer registers, and in such devices the accumulation of routing resources with optional registers may be important on timing-critical paths as well. Otherwise, during retiming, it may turn out that along a long stretch of routing elements, there will be insufficient registers that can be enabled to pipeline a critical path.

Above-incorporated U.S. patent application Ser. No. 13/733,982 discloses a method 400 (FIG. 4) that provides an FPGA configuration bitstream at 405 by performing synthesis 401, placement 402 and routing 403 with an awareness of the later availability of retiming 404 to refine the design. Retiming-aware synthesis 401, placement 402 and routing 403 in that implementation focus on reducing delay in paths (e.g., cyclic paths such as loops) that cannot be sped up through retiming 404, leaving other paths (primarily feed-forward paths) to be sped up during retiming 404.

However, as noted above, even though synthesis 401, placement 402 and routing 403 are retiming-aware, if they are not also register-aware, retiming 404 may find that the routing that has been selected prior to retiming 404 does not include sufficient available registers in all paths that require retiming.

Figure 5:
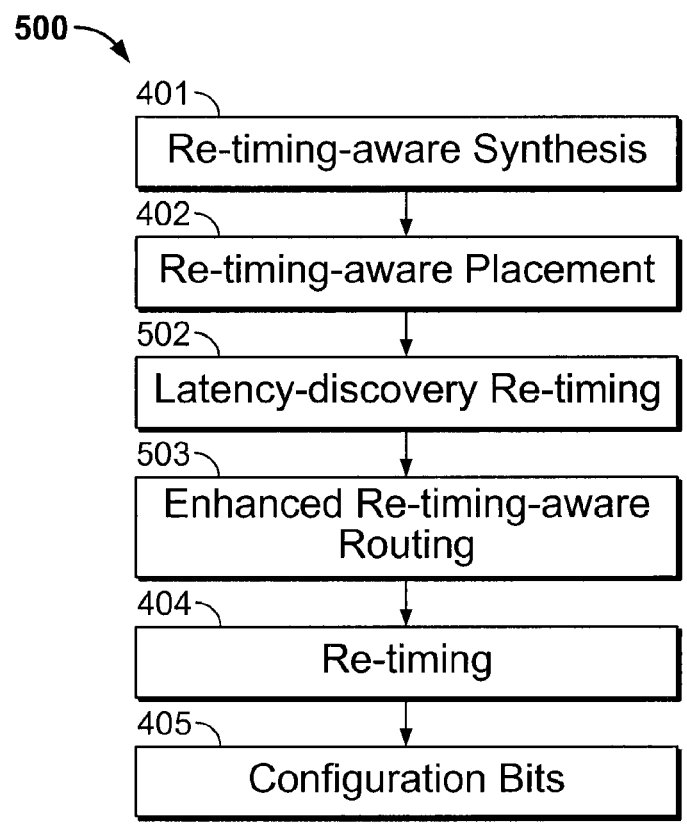
FIG. 5 shows an example of a retiming-aware design method with register awareness, in accordance with an embodiment of the present invention.

Therefore, in accordance with implementation 500 (FIG. 5) of an embodiment of the present invention, tentative routing and retiming can be performed to determine where additional latency—i.e., additional registers—may be required. The tentative routing and retiming can be separate full-blown routing and retiming operations. However, because an additional retiming-aware routing operation, as well as a final retiming operation, will later be performed, some shortcuts can be taken. For example, routing might be accelerated by trading off quality for runtime or by converging to a solution that may not be perfectly legal. Similarly, the tentative retiming algorithm might assume infinite register capacities at every block input; the first legal and timing-optimal solution found under this relaxed constraint can be used to determine latency requirements for the final retiming-aware routing operation. Therefore, as shown in FIG. 5, the tentative routing and retiming are represented as a single "latency-discovery retiming" operation 502, which includes sufficient elements of routing and retiming to discover where additional registers may be needed. The determination need not be perfect, but only "good enough" that the final retiming operation will usually find sufficient registers to achieve a desired retiming solution.

Figure 4:
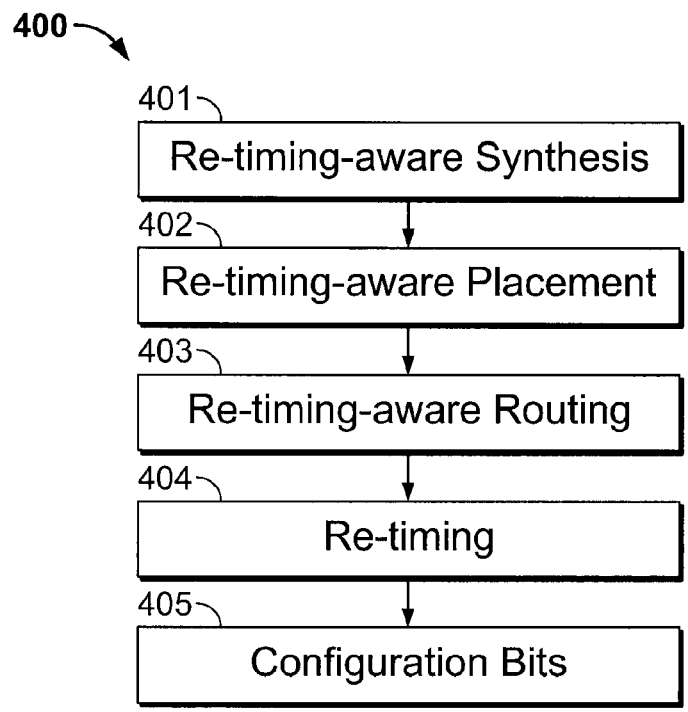
FIG. 4 shows an example of a retiming-aware design method without register awareness.

Comparing FIGS. 4 and 5, "latency-discovery retiming" operation 502 follows retiming-aware placement operation 402, which, in FIG. 4, would be followed by routing 403—i.e., "latency-discovery retiming" operation 502 would be expected to occur between a placement operation and a routing operation. This expectation is maintained in implementation 500, where "latency-discovery retiming" operation 502 occurs between retiming-aware placement operation 402, and a routing operation. In this implementation, that routing operation is an enhanced retiming-aware routing 503, which is then followed by retiming 404.

In some embodiments, latency-discovery retiming operation 502 will perform a quick routing to derive a more accurate view of post-routing delays that might benefit from pipelining. Latency-discovery retiming operation 502 also may perform a quick retiming to derive latency requirements or constraints, based on the retiming solution, that could then be used by enhanced retiming-aware routing 503. In addition, latency-discovery retiming operation 502 may bias the retiming solutions to produce favorable latency constraints (e.g., to minimize additional routing needed while still enabling good final retiming results) for enhanced retiming-aware routing operation 503.

As an alternative to latency-discovery retiming operation 502, latency requirements could be determined in other ways. This could even include user input of latency targets.

Enhanced retiming-aware routing operation 503 is built upon negotiated-congestion timing-driven routing, possibly combined with retiming awareness (as disclosed in above-incorporated U.S. patent application Ser. No. 13/733,982). A cost-driven formulation may be used in enhanced retiming-aware routing operation 503 to satisfy latency constraints. Using a cost function can produce adequate results, because enhanced retiming-aware routing operation 503 need not guarantee satisfaction of latency constraints; ultimately, the final retiming operation 404 will determine the final register placement. And even if retiming operation 404 does not meet latency constraints on all connections, so that final retiming operation 404 does not achieve the optimal retiming on all timing-critical paths, the resulting circuit will still be functional.

In order to understand the cost function used in enhanced retiming-aware routing operation 503, one can consider a typical cost function for a node, n, during timing-driven routing exploration:

backward_cost+crit*delay(n)+base_and_congestion_cost_of_node(crit, n)+future_cost(crit, n, sink)

backward_cost includes the timing and resource/congestion costs of all nodes in the partial path leading up to the current node; it is typically the sum of the node costs up to the current node (not including the future costs). crit is a number from 0 to 0.99 (inclusive) indicating the relative timing-importance of the current connection. delay(n) is the delay associated with the current node. base_and_congestion_cost_of_node( ) is the resource cost of using the node along with the congestion cost if multiple nets are contending for the same node. future_cost( ) is an estimate of the remaining cost from the current node, n, to the sink to guide the router exploration (A* search).

To make the router latency-aware, future_cost( ) may be modified in accordance with embodiments of the present invention. The modifications of future_cost( ) will direct the router to gather more registers if it is undershooting the latency constraint, and to avoid further expansion of the current branch if it is overshooting the latency constraint.

In some embodiments, the future cost can be computed as follows:

future_cost (connection, crit, n, sink, num_enabled_and_potential_regs_in_partial_path, num_enabled_regs_only_in_partial_path) {num_future_potential_regs= estimate_num_potential_regs(n, sink) estimated_latency=num_enabled_and_potential_regs_in_partial_path+num_regs_supported_by_node(n)+num_future_potential_regs if (estimated_latency<latency_requirement (connection)) {
 violation_magnitude=latency_requirement (connection)−estimated_latency
 return f(violation_magnitude)
}
if (num_enabled_regs_only_in_partial_path>latency_requirement (connection)) {
 violation_magnitude=num_enabled_regs_only_in_partial_path−latency_requirement (connection)
 return g(violation_magnitude)
}
}

In this embodiment, connection refers to the connection being routed.

num_enabled_regs_only_in_partial_path includes all the registers on the partial path that have already been enabled due to the routing of previous connections. This will be discussed further below in connection with multi-fanout nets.

num_enabled_and_potential_regs_in_partial_path includes the former value plus all the additional optional registers that have been accumulated on the partial path branch up to node n. As the router expansion proceeds, num_enabled_and_potential_regs_in_partial_path_is tracked on the heap and updated to reflect the gathering of additional potential registers.

estimate_num_potential_regs(n, sink) is an estimate of how many additional registers exist from n to the sink. In an architecture with ubiquitous registers—i.e., a single optional register on each routing element—this estimate might equal the number of routing elements until the sink. If only a fraction of the routing elements support optional registers (i.e., a less-than-fully-populated architecture), that fraction would be factored into the estimate.

num_regs_supported_by_node(n) indicates how many registers are supported by the current node, n.

latency_requirement (connection) indicates the latency requirement for the connection.

f( ) is the cost applied to undershooting the latency requirement. In some embodiments, this cost is super-linear in the violation magnitude. In other embodiments, the cost may also be increased once the path reaches a point where additional latency cannot be added downstream by the router. This increase may be achieved by increasing the violation magnitude before passing it through the super-linear function or by multiplying the result of the super-linear function by a constant.

g( ) is the cost to apply to overshooting the latency requirement. Similar to f( ) this function may be super-linear in the violation magnitude. In some embodiments, g( ) may be steeper than f( ) because overshoots cannot be corrected as easily as undershoots—i.e., in the case of a latency undershoot, more registers can be added, but registers cannot be removed to correct a latency overshoot.

As thus far described, the cost function is latency-aware, which may be all that is relevant for routing a signal along a single path. However, for multi-fanout signals, when routing a connection, knowing which registers have been enabled along previously-routed connections of the same signal, or net, may also be relevant. That is, without such knowledge, if the new connection branches near the sink of a previously routed connection of the same net, it may end up with more registers than its latency requirement.

The router may store a tentative representation of the routing resources used by all the connections of each signal. When a connection is being routed, that representation is first pruned to eliminate the resources specific to the connection that is being routed, leaving a "partial route tree" of already-routed connections as the starting point. The current connection is then routed, and the representation is updated to reflect the newly chosen route.

When computing cost for nodes already in the "partial route tree," when routing the current connection, typically the future_cost( ) function will be needed. To enable future_cost( ) to be computed for the multi-fanout case, each node in the route-tree representation will have a data member to reflect the number of registers enabled at that node, and that data member can have a value from 0 to num_regs_supported_by_node(n). For runtime efficiency, each node might also store the number of enabled registers from the source to the current node.

After each connection is routed, when the routing tree is updated, registers associated with the newly-added nodes will be tentatively enabled as needed to satisfy the latency constraint for the connection. This enabling is tentative because the final re-timing is free to consider other solutions. However, tentative enabling is useful to ensure subsequent connection routing attempts for the same net can account for decisions made for previous connections for that net.

In addition, in some embodiments, registers along a given connection are first enabled closest to the sink to increase how much of the routing tree is usable by subsequent connections that may have low latency requirements. This is related to the term num_enabled_regs_only_in_partial_path in the cost function, discussed above. If a certain number of registers is needed along a certain partial path, but a later connection may need fewer registers, then if the registers for the earlier path are enabled close to the source, it may not be possible to find a route for the later connection that does not include too many enabled registers. But if the enabled registers in the earlier path are closer to the sink, then there will more likely be a point at which the later connection can branch off prior to there being too may "enabled registers."

Figure 6:
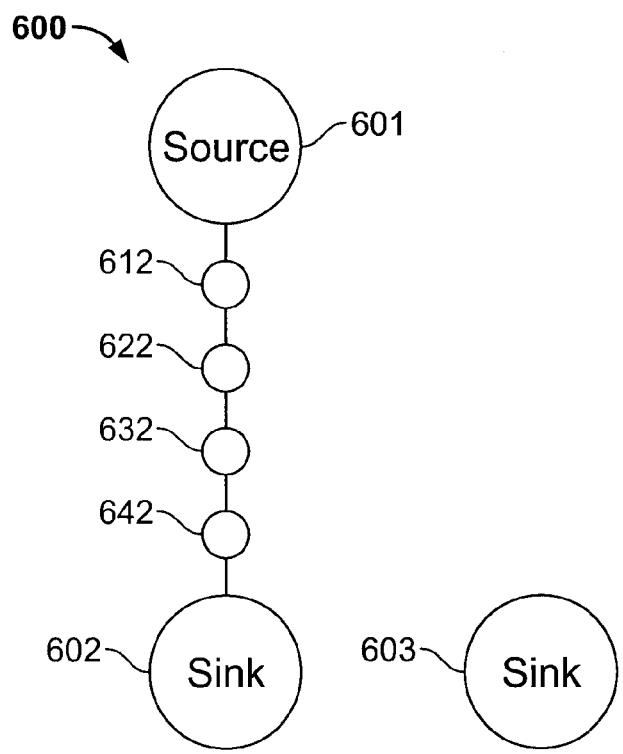
FIG. 6 shows an incomplete partial routing tree involving a multiple-fanout signal.

Consider, for example, the routing tree 600 of FIG. 6, in which a signal from source 601 must propagate to each of sinks 602, 603. There are four routing elements 612, 622, 632 and 642 between source 601 and sink 602. Suppose that the latency constraint for the path to sink 602 requires that one register be enabled in each of three of those four routing elements. Suppose also that a latency constraint for the path to sink 603 requires that no registers be enabled.

If the register in routing element 612 is enabled to satisfy part of the latency constraint for the path to sink 602, then it will not be possible to satisfy the latency constraint for the path to sink 603. However, if, as suggested above, the enabled registers in the path to sink 602 are those closest to sink 602—i.e., the registers in routing elements 622, 632 and 642—then the path to sink 603 can branch off routing element 612 with no register enabled.

Suppose, alternatively, that the latency constraint for the path to sink 603 requires two enabled registers (while the latency constraint for the path to sink 602 continues to require three enabled registers). Then the possible routings may include that shown in FIG. 7 and that shown in FIG. 8. In both drawings, registers are enabled in the routing elements that are shaded.

Figure 7:
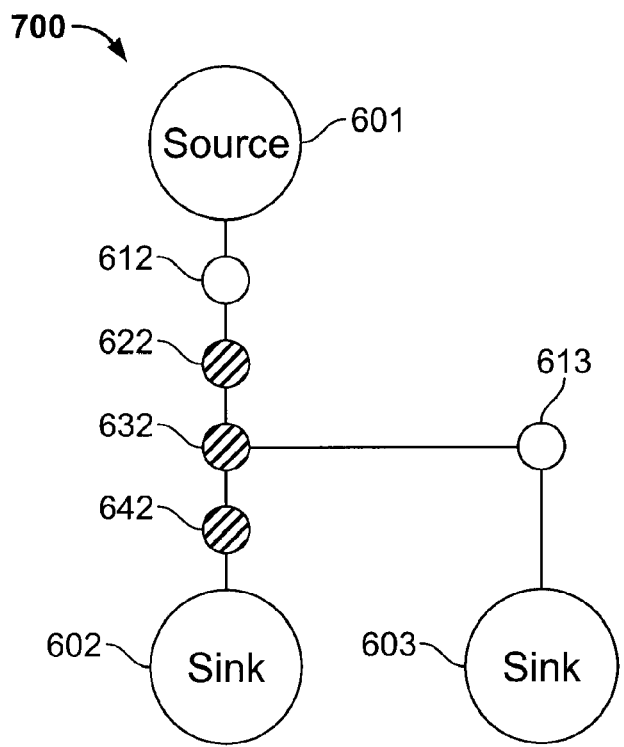
FIG. 7 shows a first solution to the partial routing of FIG. 6.
Figure 8:
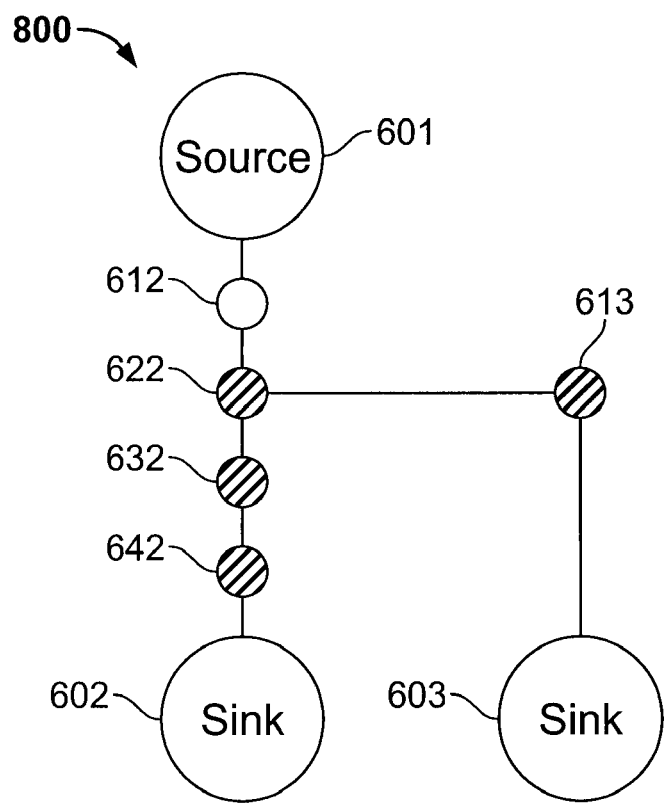
FIG. 8 shows a second solution to the partial routing of FIG. 6.

In the routing tree 700 shown in FIG. 7, the two enabled registers on the path to sink 603 are two of the three enabled registers on the path to sink 602, while another routing element 613 off the path to sink 602 but on the path to sink 603 is present, but its register is not enabled. While this routing meets the latency constraints for both paths, it provides no flexibility for the final retiming operation 404 to reduce the number of registers along the path to sink 603. On the other hand, in the routing tree 800 shown in FIG. 8, only one of the two enabled registers on the path to sink 603 is one of the three enabled registers on the path to sink 602. In this routing, the second enabled register on the path to sink 603 is the register of routing element 613. This provides increased flexibility in retiming the two separate paths, such as if timing constraints require reducing the number of registers along one of the paths. Some embodiments will consider this in the cost function of the router, favoring solutions that branch off earlier from the "partial route tree."

Another consideration involving hold time relates to how close together the routing elements are. For example, the delay between adjacent register options in the physical architecture might be smaller than that required to satisfy hold constraints. If that is the case, it might be desirable to ignore an available register that otherwise might be earmarked to be enabled. Therefore, if hold time is a concern, it may be useful to keep track of the delay since the last-enabled, or last potentially-enabled, register. Alternatively, one could track the absolute total delay from the source to the last-enabled, or last potentially-enabled, register. Then, if a resource is encountered with a register option, but the delay since the last-enabled, or last potentially-enabled, register is less than the hold requirement, that register option can be ignored (e.g., even if num_regs_supported_by_node(n)>0, it can be treated as 0). Another place where hold constraints may be considered is during the post-connection update of the routing tree, where the selection of which register to enable (see discussion of FIGS. 7 and 8 above) may be a function of the delay required to satisfy the hold constraint. In some embodiments, in addition to tracking the accumulated delay along a path, clock delays also can be tracked so that the choice among available registers can take account not only of delay between registers, but also of clock skew.

The discussion so far has assumed that all routing elements have optional registers that may be enabled.

However, in order to conserve resources, a particular physical architecture may provide a less-than-fully-populated set of routing elements—i.e., only a certain fraction (e.g., one in two, one in three, etc.) of all routing elements in the device may have an available optional register. Thus, another factor that may be taken into account during latency-discovery retiming 502 may be the number of routing elements used that do not include an available optional register. If so, only a certain maximum delay between registers may be tolerated. For example, if there is to be a clock period of 1 ns, and each routing element has a delay of 200 ps, one ordinarily would not want to traverse more than five routing elements without one of them having a register enabled. Although some less-than-fully-populated architectures can guarantee a certain minimum number of registers—e.g., the architecture can be constructed so that every routing element without a register feeds a routing element with a register—some architectures may be less structured. Therefore, a term can be added to the routing function to require a routing that passes through a potential register at least every x routing elements, or based on the delay since the last potential register and the respective clock skew.

The latency-discovery retiming and register-ware routing described above are merely examples of possible methods for latency-discovery retiming 502 and enhanced retiming-aware routing 503 in a method such as that of FIG. 5, in which programmable device configuration software, running on a suitable processor such a personal computer or workstation, can process the circuit specifications entered by a user in accordance with the foregoing discussion.

Thus it is seen that a programmable device in which a configuration is routed with "awareness" of the availability of later retiming, to provide that later retiming with sufficient optional registers to be enabled to meeting timing requirements, has been provided.

Instructions for carrying out a method according to this invention for programming a programmable device may be encoded on a machine-readable medium, to be executed by a suitable computer or similar device to implement the method of the invention for programming or configuring PLDs or other programmable devices. For example, a personal computer may be equipped with an interface to which a PLD can be connected, and the personal computer can be used by a user to program the PLD using suitable software tools as described above.

FIG. 9 presents a cross section of a magnetic data storage medium 1200 which can be encoded with a machine executable program that can be carried out by systems such as the aforementioned personal computer, or other computer or similar device, or encoded with a library of virtual fabrics. Medium 1200 can be a floppy diskette or hard disk, or magnetic tape, having a suitable substrate 1201, which may be conventional, and a suitable coating 1202, which may be conventional, on one or both sides, containing magnetic domains (not visible) whose polarity or orientation can be altered magnetically. Except in the case where it is magnetic tape, medium 1200 may also have an opening (not shown) for receiving the spindle of a disk drive or other data storage device.

The magnetic domains of coating 1202 of medium 1200 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

FIG. 10 shows a cross section of an optically-readable data storage medium 1210 which also can be encoded with such a machine-executable program, which can be carried out by systems such as the aforementioned personal computer, or other computer or similar device, or encoded with a library of virtual fabrics. Medium 1210 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 1210 preferably has a suitable substrate 1211, which may be conventional, and a suitable coating 1212, which may be conventional, usually on one or both sides of substrate 1211.

In the case of a CD-based or DVD-based medium, as is well known, coating 1212 is reflective and is impressed with a plurality of pits 1213, arranged on one or more layers, to encode the machine-executable program. The arrangement of pits is read by reflecting laser light off the surface of coating 1212. A protective coating 1214, which preferably is substantially transparent, is provided on top of coating 1212.

In the case of magneto-optical disk, as is well known, coating 1212 has no pits 1213, but has a plurality of magnetic domains whose polarity or orientation can be changed magnetically when heated above a certain temperature, as by a laser (not shown). The orientation of the domains can be read by measuring the polarization of laser light reflected from coating 1212. The arrangement of the domains encodes the program as described above.

Figure 11:
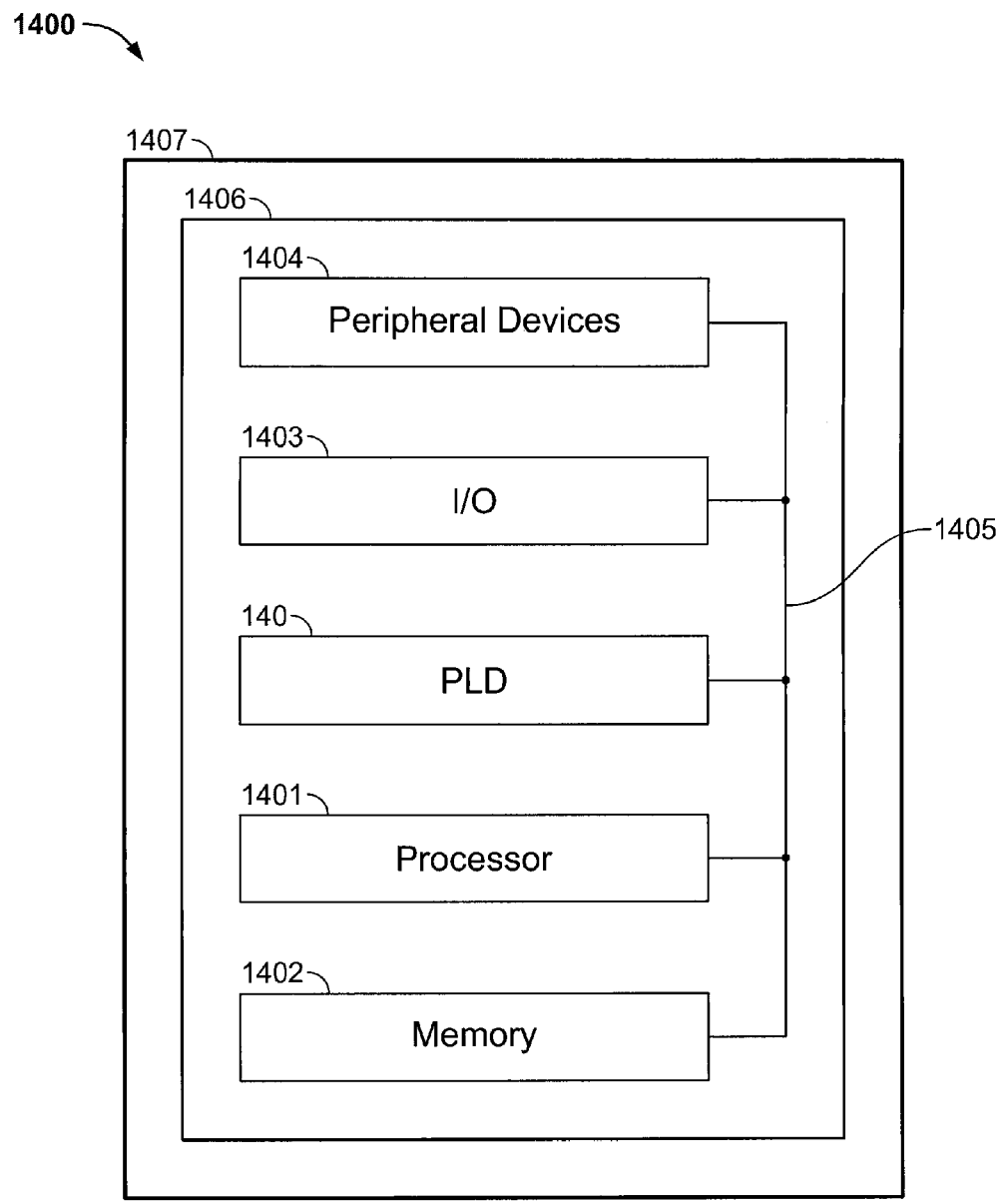
FIG. 11 is a simplified block diagram of an illustrative system employing a programmable logic device incorporating the present invention.

A PLD 140 programmed according to the present invention may be used in many kinds of electronic devices. One possible use is in a data processing system 1400 shown in FIG. 11. Data processing system 1400 may include one or more of the following components: a processor 1401; memory 1402; I/O circuitry 1403; and peripheral devices 1404. These components are coupled together by a system bus 1405 and are populated on a circuit board 1406 which is contained in an end-user system 1407.

System 1400 can be used in a wide variety of applications, such as computer networking, data networking, instrumentation, video processing, digital signal processing, or any other application where the advantage of using programmable or reprogrammable logic is desirable. PLD 140 can be used to perform a variety of different logic functions. For example, PLD 140 can be configured as a processor or controller that works in cooperation with processor 1401. PLD 140 may also be used as an arbiter for arbitrating access to a shared resources in system 1400. In yet another example, PLD 140 can be configured as an interface between processor 1401 and one of the other components in system 1400. It should be noted that system 1400 is only exemplary, and that the true scope and spirit of the invention should be indicated by the following claims.

Various technologies can be used to implement PLDs 140 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A method of configuring an integrated circuit device with a user logic design, said method comprising:
    analyzing said user logic design to identify timing requirements of parallel paths within said user logic design;
    determining latency requirements along said parallel paths;
    routing said user logic design based on availability of storage elements for incorporation into said parallel paths to satisfy said latency requirements;
    retiming said user logic design following said routing by incorporating at least some of said storage elements into said parallel paths;
    generating a configuration bitstream based on said analyzing, said determining, said routing and said retiming; and
    storing said configuration bitstream in configuration memory of said programmable integrated circuit device.

2. The method of claim 1 wherein said determining comprises performing a preliminary retiming operation to determine said latency requirements.

3. The method of claim 2 wherein said determining further comprises performing a preliminary routing operation.

4. The method of claim 1 wherein said routing is based on a cost function.

5. The method of claim 4 wherein said cost function accounts for said latency requirements.

6. The method of claim 4 wherein said cost function accounts for a hold constraint in said user logic design.

7. The method of claim 6 wherein said cost function comprises tracking accumulated delay from a previous storage element on one of the paths being routed.

8. The method of claim 7 wherein said cost function further comprises tracking accumulated clock skew between said previous storage element and a candidate storage element.

9. The method of claim 4 wherein:
    said user logic design includes at least one signal that fans out to multiple destinations along multiple paths; and
    said cost function accounts, in selecting storage elements for incorporation into one of said multiple paths, for storage elements already incorporated in a partial path included in said one of said multiple paths.

10. The method of claim 1 wherein said integrated circuit device includes distributed storage elements, said incorporating comprising adjusting at least one of said parallel paths to pass through ones of said distributed storage elements.

11. The method of claim 1 wherein said integrated circuit device includes routing elements having optionally enabled storage elements, said incorporating comprising enabling ones of said optionally enabled storage elements.

12. The method of claim 11 wherein:
    said integrated circuit device includes routing elements having said optionally enabled storage elements and routing elements lacking said optional available storage elements; and
    said routing comprises selecting a combination of said routing elements having said optional available storage elements and said routing elements lacking said optional available storage elements based on said timing requirements.

13. A non-transitory machine readable storage medium encoded with instructions for performing a method of configuring an integrated circuit device with a user logic design, said instructions comprising:

instructions to perform analysis of said user logic design to identify timing requirements of parallel paths within said user logic design;

instructions to determine latency requirements along said parallel paths;

instructions to perform routing of said user logic design based on availability of storage elements for incorporation into said parallel paths to satisfy said latency requirements; and instructions to perform retiming of said user logic design following said routing by incorporating at least some of said storage elements into said parallel paths.

14. The non-transitory machine readable storage medium of claim 13 wherein said instructions to determine comprise instructions to perform a preliminary retiming operation to determine said latency requirements.

15. The non-transitory machine readable storage medium of claim 14 wherein said instructions to determine further comprise instructions to perform a preliminary routing operation.

16. The non-transitory machine readable storage medium of claim 13 wherein said instructions to perform routing comprise instructions to perform routing based on a cost function.

17. The non-transitory machine readable storage medium of claim 16 wherein said instructions to perform routing based on a cost function comprise instructions to perform routing based on a cost function that accounts for said latency requirements.

18. The non-transitory machine readable storage medium of claim 16 wherein said instructions to perform routing based on a cost function comprise instructions to perform routing based on a cost function that accounts for a hold constraint in said user logic design.

19. The non-transitory machine readable storage medium of claim 18 wherein said instructions to perform routing based on said cost function further comprise instructions to track accumulated delay from a previous storage element on one of the paths being routed.

20. The non-transitory machine readable storage medium of claim 16 wherein said instructions to perform routing based on said cost function further comprise instructions to track accumulated clock skew between said previous storage element and a candidate storage element.

21. The non-transitory machine readable storage medium of claim 16 wherein:

said user logic design includes at least one signal that fans out to multiple destinations along multiple paths; and said instructions to perform routing based on said cost function comprise instructions to account, in selecting storage elements for incorporation into one of said multiple paths, for storage elements already incorporated in a partial path included in said one of said multiple paths.

22. The non-transitory machine readable storage medium of claim 13 wherein said integrated circuit device includes distributed storage elements, said instructions to perform retiming of said user logic design following said routing by incorporating at least some of said storage elements comprising instructions to adjust said at least one of said parallel paths to pass through ones of said distributed storage elements.

23. The non-transitory machine readable storage medium of claim 13 wherein said integrated circuit device includes routing elements having optionally enabled storage elements, said instructions to perform retiming of said user logic design following said routing by incorporating at least some of said storage elements comprising instructions to enable ones of said optionally enabled storage elements.

24. The non-transitory machine readable storage medium of claim 23 wherein:

said integrated circuit device includes routing elements having said optionally enabled storage elements and routing elements lacking said optional available storage elements; and said instructions to perform retiming of said user logic design following said routing by incorporating at least some of said storage elements comprising instructions to select a combination of said routing elements having said optional available storage elements and said routing elements lacking said optional available storage elements based on said timing requirements.

* * * * *